(12) United States Patent
Gehrmann

(10) Patent No.: US 8,712,474 B2
(45) Date of Patent: Apr. 29, 2014

(54) SECURE SOFT SIM CREDENTIAL TRANSFER

(75) Inventor: Christian Gehrmann, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1475 days.

(21) Appl. No.: 11/944,818

(22) Filed: Nov. 26, 2007

(65) Prior Publication Data

US 2008/0261561 A1 Oct. 23, 2008

Related U.S. Application Data

(60) Provisional application No. 60/913,089, filed on Apr. 20, 2007.

(51) Int. Cl.
*H04M 1/00* (2006.01)
*H04B 1/38* (2006.01)

(52) U.S. Cl.
USPC .............. 455/558; 455/411; 455/419; 455/70

(58) Field of Classification Search
USPC ............. 455/69, 70, 410, 411, 558, 418–420; 380/247–250, 277–286, 44–47
See application file for complete search history.

(56) References Cited

U.S. PATENT DOCUMENTS

| | | | | |
|---|---|---|---|---|
| 5,604,787 | A * | 2/1997 | Kotzin et al. | 455/558 |
| 5,933,773 | A * | 8/1999 | Barvesten | 455/411 |
| 6,002,929 | A * | 12/1999 | Bishop et al. | 455/431 |
| 6,285,869 | B1 * | 9/2001 | Shannon et al. | 455/411 |
| 6,427,073 | B1 * | 7/2002 | Kortesalmi et al. | 455/414.1 |
| 6,516,357 | B1 | 2/2003 | Hamann et al. | |
| 6,587,127 | B1 | 7/2003 | Leeke et al. | |
| 6,714,799 | B1 * | 3/2004 | Park et al. | 455/558 |
| 6,868,282 | B2 * | 3/2005 | Carlsson | 455/558 |
| 6,928,299 | B1 * | 8/2005 | Rinne et al. | 455/555 |
| 6,934,391 | B1 * | 8/2005 | Linkola et al. | 380/247 |
| 6,957,199 | B1 | 10/2005 | Fisher | |
| 6,980,830 | B2 * | 12/2005 | Ahonen | 455/558 |

(Continued)

FOREIGN PATENT DOCUMENTS

| | | |
|---|---|---|
| EP | 1758335 A1 | 2/2007 |
| GB | 2294787 A | 5/1996 |

(Continued)

OTHER PUBLICATIONS

Alves, T. et al. "TrustZone: Integrated Hardware and Software Security." White Paper, ARM. Available at http://www.arm.com/pdfs/TZ_Whitepaper.pdf.

(Continued)

*Primary Examiner* — Edward Urban
*Assistant Examiner* — Rui Hu
(74) *Attorney, Agent, or Firm* — Coats & Bennett, P.L.L.C.

(57) ABSTRACT

The method and apparatus described herein transfers soft SIM credentials from a transferring mobile device to a target mobile device while ensuring that only one mobile device contains active soft SIM credentials at a time. Broadly, a transferring mobile device securely transfers the soft SIM credentials to a target mobile device either directly or via a network server. Before the target mobile device receives or activates the soft SIM credentials, the transferring mobile device deactivates the soft SIM credentials to ensure that only one mobile device contains the active soft SIM credentials.

14 Claims, 3 Drawing Sheets

(56) References Cited

U.S. PATENT DOCUMENTS

| | | | |
|---|---|---|---|
| 7,178,724 B2 | 2/2007 | Tamagno et al. | |
| 7,222,783 B2 | 5/2007 | Merrien | |
| 7,363,056 B2 * | 4/2008 | Faisy | 455/558 |
| 7,558,110 B2 * | 7/2009 | Mizushima et al. | 365/185.04 |
| 7,603,107 B2 * | 10/2009 | Ratert et al. | 455/414.1 |
| 7,729,725 B2 * | 6/2010 | Stenmark | 455/558 |
| 7,778,227 B2 * | 8/2010 | Gibbs | 370/338 |
| 7,957,729 B2 * | 6/2011 | Roter et al. | 455/422.1 |
| 8,095,184 B2 * | 1/2012 | Hiltunen et al. | 455/558 |
| 8,131,317 B2 * | 3/2012 | Lee | 455/558 |
| 8,140,064 B2 * | 3/2012 | Mardiks | 455/419 |
| 8,180,400 B2 * | 5/2012 | Shin et al. | 455/558 |
| 8,195,233 B2 * | 6/2012 | Morikuni et al. | 455/558 |
| 8,195,235 B2 * | 6/2012 | Montes | 455/558 |
| 2002/0165008 A1 * | 11/2002 | Sashihara et al. | 455/558 |
| 2003/0005435 A1 | 1/2003 | Nelger et al. | |
| 2003/0028763 A1 * | 2/2003 | Malinen et al. | 713/155 |
| 2003/0051041 A1 | 3/2003 | Kalavade et al. | |
| 2004/0023689 A1 * | 2/2004 | Ahonen | 455/558 |
| 2004/0042604 A1 * | 3/2004 | Hiltunen et al. | 379/211.05 |
| 2004/0137890 A1 | 7/2004 | Kalke | |
| 2004/0204087 A1 * | 10/2004 | Carlsson | 455/558 |
| 2004/0229601 A1 | 11/2004 | Zabawskyj et al. | |
| 2004/0256451 A1 | 12/2004 | Goman et al. | |
| 2005/0009563 A1 * | 1/2005 | Stenmark | 455/558 |
| 2005/0075137 A1 * | 4/2005 | Reemtsma | 455/559 |
| 2005/0239504 A1 * | 10/2005 | Ishii et al. | 455/558 |
| 2005/0266883 A1 * | 12/2005 | Chatrath | 455/558 |
| 2006/0020783 A1 | 1/2006 | Fisher | |
| 2006/0059340 A1 | 3/2006 | Eldenmalm et al. | |
| 2006/0075242 A1 | 4/2006 | Aissi et al. | |
| 2006/0076420 A1 | 4/2006 | Prevost et al. | |
| 2006/0079254 A1 | 4/2006 | Hogan | |
| 2006/0129848 A1 | 6/2006 | Paksoy et al. | |
| 2006/0183500 A1 * | 8/2006 | Choi | 455/558 |
| 2006/0224887 A1 | 10/2006 | Vesikivi et al. | |
| 2006/0291455 A1 | 12/2006 | Katz et al. | |
| 2007/0004457 A1 * | 1/2007 | Han | 455/558 |
| 2007/0077966 A1 | 4/2007 | Huang | |
| 2007/0124490 A1 | 5/2007 | Kalavade et al. | |
| 2007/0167161 A1 * | 7/2007 | Cheng et al. | 455/435.1 |
| 2007/0177562 A1 * | 8/2007 | Castrogiovanni et al. | 370/338 |
| 2008/0020755 A1 * | 1/2008 | Liu et al. | 455/432.1 |
| 2008/0169350 A1 * | 7/2008 | Audebert et al. | 235/492 |
| 2008/0220743 A1 * | 9/2008 | Mora et al. | 455/411 |
| 2009/0225736 A1 * | 9/2009 | Patarkazishvili | 370/338 |
| 2010/0088401 A1 * | 4/2010 | Degraeve et al. | 709/223 |

FOREIGN PATENT DOCUMENTS

| | | |
|---|---|---|
| JP | 2000194660 | 7/2000 |
| KR | 20060100086 | 9/2006 |
| WO | 99/27730 | 6/1999 |
| WO | 00/79368 | 12/2000 |
| WO | 02/089449 | 11/2002 |
| WO | 2004/021296 A1 | 3/2004 |

OTHER PUBLICATIONS

Dierks, T. et al. "The Transport Layer Security (TLS) Protocol." (Version 1.1). Network Working Group Request for Comments: 4346; Apr. 2006.

Harkins, D. et al. "The Internet Key Exchange (IKE)." Network Working Group Request for Comments: 2409; Nov. 1998.

Kent, S. et al. "Security Architecture for the Internet Protocol." Network Working Group Request for Comments: 2401; Nov. 1998.

Niemi, V. et al. UMTS Security. Wiley, Jan. 2004. pp. 63-71. ISBN: 978-0-470-84794-7.

TCG Mobile Trusted Module Specification. Specification version 0.9, Revision 1, Sep. 12, 2006. TCG 2006. Available at www.trustedcomputinggroup.org.

Arsenault, A. et al. "Securely Available Credentials—Requirements." IETF, Network Working Group Request for Comments: 3157, Baltimore Technologies, Aug. 2001. XP015008938.

* cited by examiner

SECURE SOFT SIM CREDENTIAL TRANSFER

This application claims priority from U.S. Provisional Application No. 60/913,089, filed 20 Apr. 2007, which is incorporated herein by reference.

BACKGROUND

The present invention relates generally to Subscriber Identity Modules (SIMs), and more particularly to the secure transfer of soft SIMs.

Wireless communication standards, such as GSM and UMTS, typically require a mobile device to include a SIM on an integrated circuit card, referred to herein as a SIM card. The SIM card securely stores SIM subscription credentials, e.g., a service subscriber key corresponding to the user of the mobile device, and performs security sensitive tasks. A SIM card allows a user to change mobile devices by removing the SIM card from one mobile device and inserting it into another mobile device.

Currently, a communication network may use any one of several different over the air techniques or protocols to update a SIM card. For example, the communication network may include or interface with a central database that backs-up personal information for a plurality of SIM cards. The network device may transfer the stored back-up information corresponding to a particular user from the database to the user's SIM card upon request. While such over the air transfer techniques provide some personal information, they currently do not provide a complete or secure SIM subscription credential transfer. Thus, conventional over the air SIM information transfer techniques still require a SIM card in the target device to ensure the security and the integrity of the SIM.

While SIM cards may be appropriate for high end or complex mobile devices, such as mobile telephones, personal data assistants, etc., the costs associated with a SIM card may be prohibitively high for simple and/or low cost mobile devices. Further, while future standards may require the same security functions implemented by conventional SIM cards, such standards may not require an actual hardware implementation of a SIM (e.g., SIM card). Thus, there remains a need for alternative SIM solutions.

SUMMARY

The present invention provides a process for transferring soft SIM credentials to a target mobile device to provide the target mobile device with a complete SIM subscription, including all secret parameters. The transfer process of the present invention further ensures that only one mobile device contains active SIM credentials at any one time. Broadly, a SIM unit in a transferring mobile device securely transfers the soft SIM credentials to a SIM unit in a target mobile device either directly or via a network server. Before the SIM unit in the target mobile device receives and/or activates the soft SIM credentials, the SIM unit of the transferring mobile device deactivates the soft SIM credentials to ensure that only one mobile device contains the active soft SIM credentials.

A peer-to-peer SIM transfer process according to one embodiment of the present invention securely transfers the soft SIM credentials, referred to herein as SSIM, from a SIM unit in one mobile device to a SIM unit in another mobile device while ensuring that only one of the mobile devices holds a valid and active SSIM at any given time. More particularly, a transferring mobile device retrieves its SSIM from its SIM unit, and securely sends the retrieved SSIM to the target mobile device. After the SIM unit at the target mobile device verifies the authenticity of the received SSIM, the target mobile device installs the SSIM in its SIM unit and sends an installation ready message to the transferring mobile device. In response, the transferring mobile device deactivates the SSIM in its SIM unit, and sends a deactivation complete message to the target mobile device. Subsequently, the target mobile device's SIM unit activates the installed SSIM and sends an activation complete message to the transferring mobile device. In response to the received activation complete message, the transferring mobile device deletes the SSIM stored in its SIM unit.

A network assisted SIM transfer process according to another embodiment of the present invention securely transfers the SSIM from a SIM unit in one mobile device to a SIM unit in another mobile device via a network server while guaranteeing that only one of the mobile devices holds a valid and active SSIM at any given time. More particularly, a target mobile device securely sends its identifier to the transferring mobile device. The target mobile device may also optionally securely send its security credentials to the transferring mobile device. Subsequently, the transferring mobile device retrieves its SSIM from its SIM unit, and securely sends the retrieved SSIM to the network server, along with the security credentials for the target mobile device. The network server deactivates the received SSIM, and sends a deactivation command to the transferring mobile device. In response, the SIM unit in the transferring mobile device deactivates the SSIM in its SIM unit, and sends a deactivation acknowledgement to the network server. Subsequently, the network server reactivates the SSIM and securely sends the activated SSIM to the SIM unit of the target mobile device. The target mobile device's SIM unit verifies the authenticity of the received SSIM, installs the activated SSIM received from the network, and sends an installation acknowledgement to the network server.

DETAILED DESCRIPTION

Figure 1:
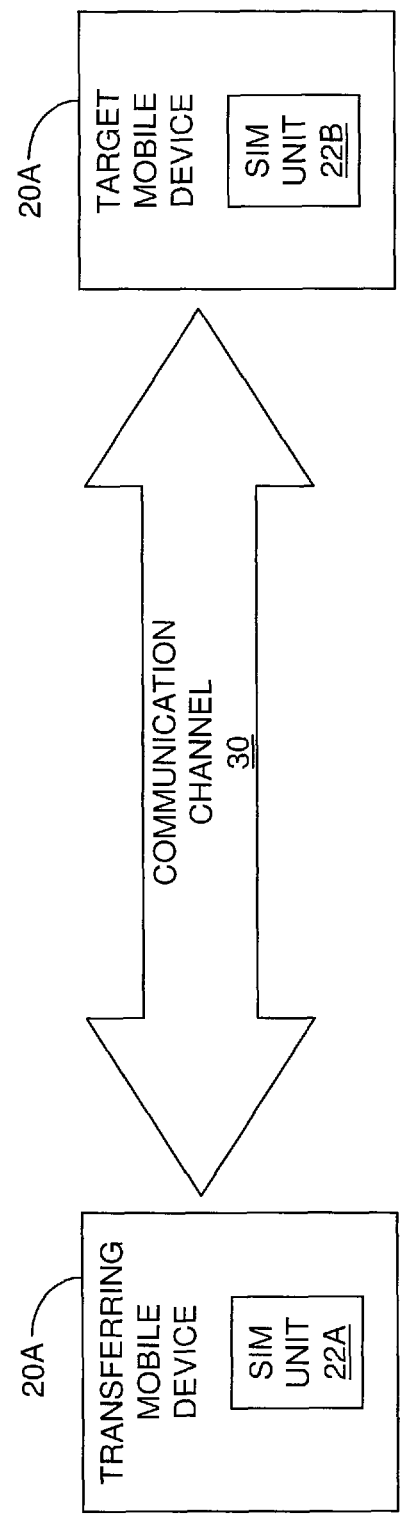
FIG. 1 shows a block diagram of an exemplary communication network.

FIG. 1 shows one exemplary communication network 10 according to the present invention. The communication network 10 includes two or more mobile devices, generally referred to with reference number 20. Mobile devices 20 communicate with each other over a communication channel 30. The communication channel 30 may be established using any type of wired or wireless connection, including local connections, e.g., a Bluetooth or USB connections, and network based connections, e.g., cellular or Internet connections.

The present invention securely transfers soft SIM credentials (SSIM) from a SIM unit 22A in a transferring mobile device 20A to a SIM unit 22B in a target mobile device 20B via the communication channel 30 while ensuring that only one of the mobile devices 20 holds a valid and active SSIM at any given time. The SIM unit 22 comprises protected storage combined with a processor that provides a protected environment for executing software associated with SIM operations and soft SIM transfer. The SIM unit 22 may comprise, for example, a Mobile Trusted Module (MTM) associated with the Trusted Computing Group (TCG), an ARM Trust Zone execution environment, etc. As used herein, the soft SIM credentials associated with the user of a transferring mobile device 22A will be denoted by $SSIM_A$, while the soft SIM credentials associated with the user of a target mobile device 20B will be denoted by $SSIM_B$. It will be appreciated that the transferred SSIM may also include other SIM data, e.g., personal information about the user associated with the SSIM.

The SIM unit 22 in each mobile device 20 may further contain and protect additional sensitive information associated with the mobile device 20 and/or SIM credentials. For example, the SIM unit 22 may contain and protect a soft SIM certificate signed by a trusted authority, such as the manufacturer of the mobile device 20 or a third party certification authority. The soft SIM certificate may contain, among other parameters, a unique identifier ($ID_{auth}$) of the trusted authority. The signature used to sign the soft SIM certificate may also sign encryption keys associated with the soft SIM, such as a private and public key pair associated with the soft SIM. Such a private and public key pair may, for example, be installed in the SIM unit 22 by the manufacturer at the same time as the first installation of the soft SIM into the SIM unit 22. As used herein, the soft SIM certificate associated with $SSIM_A$ will be denoted by $SC_A$, while the soft SIM certificate associated with $SSIM_B$ will be denoted by $SC_B$.

Figure 2:
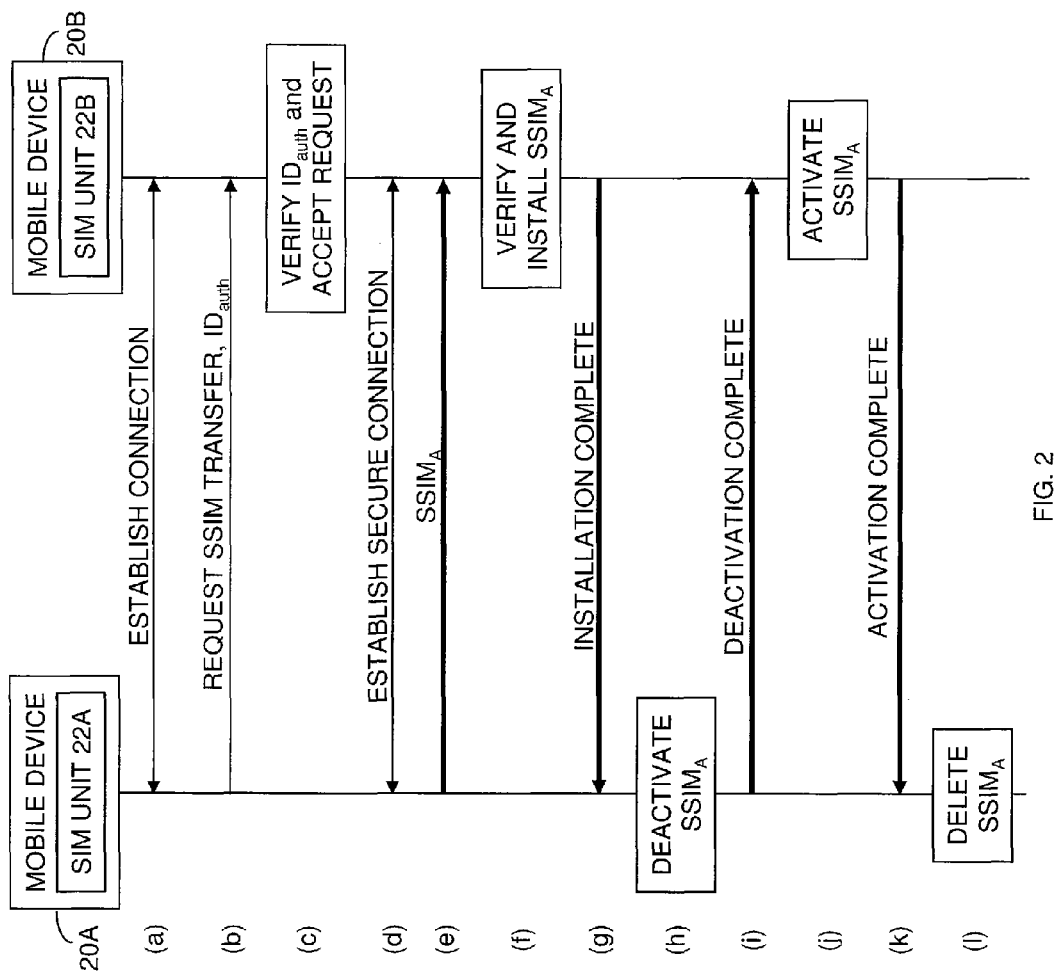
FIG. 2 shows a process diagram for a peer-to-peer transfer of soft SIM credentials according to one embodiment of the present invention.

FIG. 2 shows an exemplary process for implementing a peer-to-peer transfer of soft SIM credentials from a transferring mobile device 20A to a target mobile device 20B. Broadly, the peer-to-peer process transfers $SSIM_A$ from a transferring SIM unit 22A to a target SIM unit 22B, and deactivates the $SSIM_A$ in the transferring SIM unit 22A before activating the $SSIM_A$ in the target SIM unit 22B. For this embodiment, it is assumed that the $SSIM_A$ in the SIM unit 22A of the transferring mobile device is customized with $SC_A$.

As shown in FIG. 2, a connection is established between the transferring mobile device 20A and the target mobile device 20B (step a). The connection may comprise any type of wired or wireless connection, including local connections, such as Bluetooth and USB, and network based connections, such as a cellular or Internet connection. The SIM unit 22A in the transferring mobile device 20A sends a request for a credential transfer to the SIM unit 22B in a target mobile device 20B via the established connection (step b). The transfer request includes the identifier ($ID_{auth}$) of the trusted authority that issued $SSIM_A$. If the target SIM unit 22B trusts the authority identified by $ID_{auth}$, the target SIM unit 22B accepts the credential transfer request (step c).

Subsequently, a secure connection is established between the transferring and target mobile devices 20A, 20B (step d). The secure connection protects all messages exchanged between the devices 20 using mutual authentication, key agreement, and/or confidentiality and integrity protection. The secure connection may be established, for example, according to the Transport Layer Security (TLS) protocol or the Internet Key Exchange/IP security (IKE/IPsec) protocol. While not required, the soft SIM certificates for one or both mobile devices 20A, 20B may be used to facilitate any authentication and/or key agreement process.

The transferring SIM unit 22A sends $SSIM_A$ to the target SIM unit 22B over the secure connection (step e). In some embodiments, the transferring SIM unit 22A may further encrypt $SSIM_A$ using the target device's public key provided by the $SC_B$. The target SIM unit 22B verifies and installs the received $SSIM_A$ (step f). For example, the target SIM unit 22B may decrypt the $SSIM_A$ and check any signatures associated with the decrypted $SSIM_A$. If able to verify the $SSIM_A$, the target SIM unit 22B installs $SSIM_A$ (step f), and sends an installation complete message to the transferring mobile device 20A (step g).

Responsive to the installation complete message, the transferring SIM unit 22A deactivates $SSIM_A$ (step h). The deactivation process does not delete $SSIM_A$ from the SIM unit 22. Instead, the deactivation process simply makes $SSIM_A$ inactive, and therefore, prevents the transferring mobile device 20A from using $SSIM_A$ for any network service. The transferring SIM unit 22A also stores $SC_B$ to ensure that $SSIM_A$ may only be reactivated by the target mobile device 20B. After the deactivation process is complete, the transferring mobile device 20A sends a deactivation complete message to the target mobile device 20B (step i).

Upon receipt of the deactivation complete message, the target SIM unit 22B activates the previously received $SSIM_A$ (step j), and sends an activation complete message to the target mobile device 20A (step k). Once the $SSIM_A$ is activated in the target SIM unit 22B, $SSIM_A$ becomes $SSIM_B$, and the target mobile device 20B may use the activated soft SIM credentials to obtain network services. Upon receipt of the activation complete message, the transferring SIM unit 22A deletes the $SSIM_A$ and all associated data from the secure SIM 22 (step l).

The above describes the peer-to-peer SSIM transfer process in terms of a secure channel established between the transferring and target mobile devices 20A, 20B. However, it will be appreciated that the transferring mobile device 20A may use any means to securely transfer $SSIM_A$ to the target mobile device 20B. For example, the transferring mobile device 20A may encrypt the $SSIM_A$, and send the encrypted $SSIM_A$ to the target mobile device 20B over a non-secure channel.

It will be appreciated that the above-described peer-to-peer transfer process is fairly robust. For example, if the connection at step e is broken, the target SIM unit 22B may request a retransfer of $SSIM_A$. In the mean time, the transferring mobile device 20A may still use $SSIM_A$ to access network services. Further, if the connection at step g is broken, the $SSIM_A$ that is installed in both the transferring and target mobile devices 20A, 20B, may only be used by the transferring mobile device 20A because only the transferring mobile device 20A contains an active $SSIM_A$. To continue the transfer process, the transferring mobile device 20A may prompt the target mobile device 20B for an installation complete message by, for example, requesting an update on the installation process from the target mobile device 20B.

If the connection is broken at step i, $SSIM_A$ is deactivated in both devices 20A, 20B, and therefore, cannot be used by either device. In this case, the transferring SIM unit 22A may send the target SIM unit 22B a request to cancel the transfer to cause the target SIM unit 22B to delete the installed $SSIM_A$, and to send a reactivation message to the transferring mobile device 20A to enable the transferring SIM unit 22A to reactivate the $SSIM_A$. Alternatively, the transferring SIM unit 22A may contact a network operator and ask for new SIM credentials. In this case, $SSIM_A$ will be deleted from both devices 20A, 20B and will be unavailable for future use.

If the connection is broken at step k, the transferring mobile device 20A will not receive the activation complete message, and therefore, the transferring SIM unit 22A will not delete $SSIM_A$ and all associated data from the SIM unit 22. Since $SSIM_A$ is deactivated in the transferring mobile device 20A, the transferring SIM unit 22A will not be able to use $SSIM_A$ for any network services. In this case, the transferring SIM unit 22A may be programmed to delete $SSIM_A$ after some predetermined period of time has elapsed.

Figure 3:
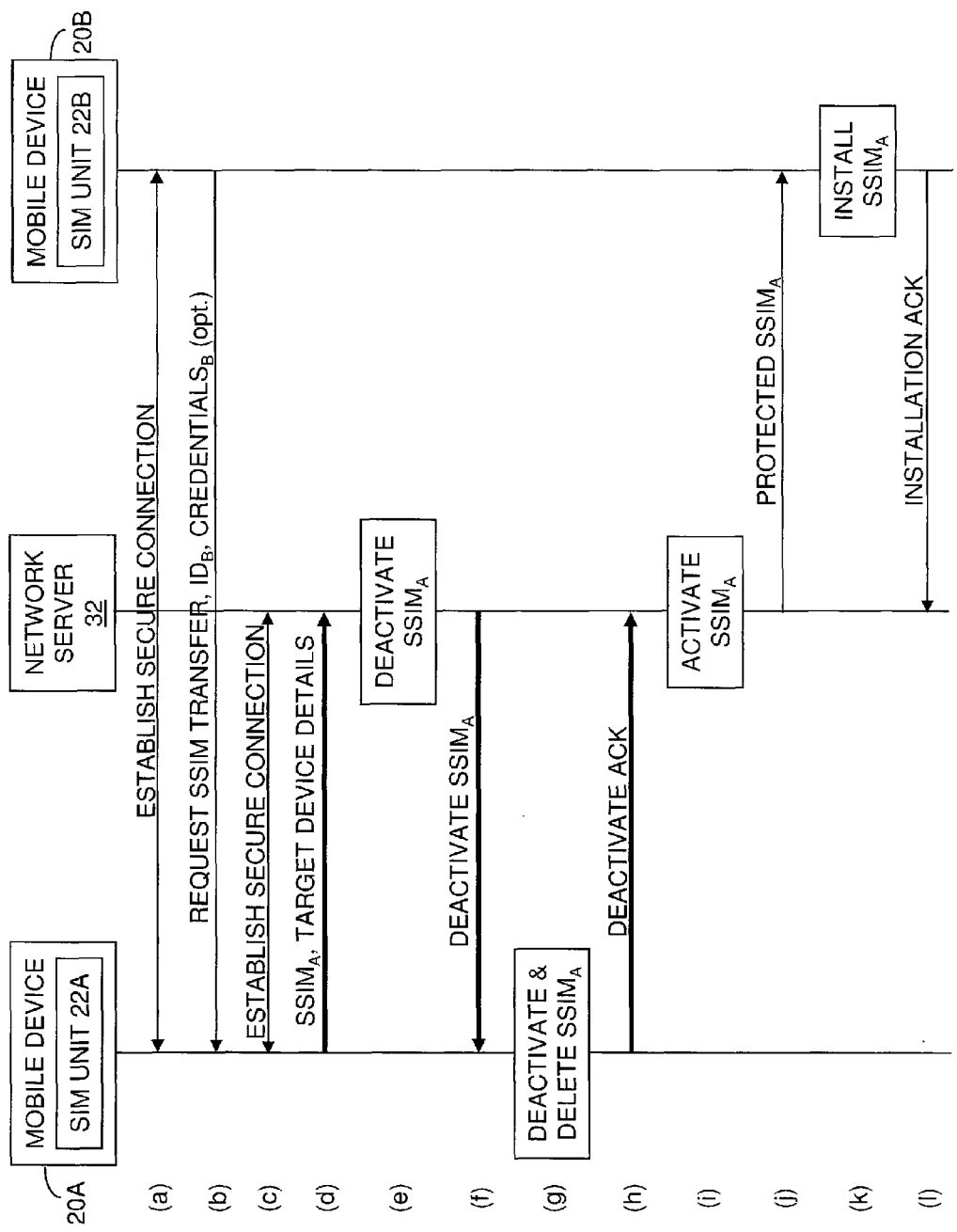
FIG. 3 shows a process diagram for a network based transfer of soft SIM credentials according to one embodiment of the present invention.

FIG. 3 shows an alternative process for implementing a network assisted transfer of soft SIM credentials from a transferring mobile device 20A to a target mobile device 20B. This embodiment includes a network server 32, e.g., a subscriber server, to assist the mobile devices 20 with the SSIM transfer process. Broadly, the network-assisted process transfers the SSI MA from the transferring mobile device 20A to the server 32, and from the server 32 to the target mobile device 20B. The server 32 deactivates the $SSIM_A$ at the transferring SIM unit 22A before activating the $SSIM_A$ at the server 32 and forwards the active $SSIM_A$ to the target SIM unit 22B. For this embodiment, it is assumed that the $SSIM_A$ in the SIM unit 22A of the transferring mobile device 20A is customized with one or more security credentials. Exemplary security credentials may comprise the above-described $SC_A$ and/or shared secrets between the network server 32 and the transferring SIM units 22A. As used herein, a shared secret between the transferring mobile device 22A and the network server 32 will be denoted by $K_A$, while a shared secret between the target mobile device 22B and the network server 32 will be denoted by $K_B$.

First, a secure connection is established between the transferring mobile device 20A and the target mobile device 20B (step a). The connection may comprise any type of wired or wireless connection, including local connections, such as Bluetooth and USB, and network based connections, such as a cellular or Internet connection. Further, the connection may be secured using any known securing process. The SIM unit 22B in the target mobile device 20B sends a SSIM transfer request to the SIM unit 22A in the transferring mobile device 20A (step b). The request includes the target mobile device's network identity ($ID_B$), e.g., its IP address, MSISDN, etc. While not required, the request may also include the target mobile device's security certificate ($SC_B$).

The transferring SIM unit 22A may accept or reject the credential transfer request by confirming the authority of the target mobile device 20B and/or based on settings in the target mobile device 20A and/or its SIM unit 22A. If the transferring SIM unit 22A accepts the credential transfer request, the transferring mobile device 20A establishes a secure connection with the network server 32 (step c). The secure connection protects all messages exchanged between the transferring mobile devices 20A and the network server 32 using mutual authentication, key agreement, and/or confidentiality and integrity protection. The secure connection may be established, for example, according to the Transport Layer Security (TLS) protocol or the Internet Key Exchange/IP security (IKE/IPsec) protocol.

The transferring SIM unit 22A uses the secure connection to send its $SSIM_A$ and details about the target mobile device 20B, e.g., $ID_B$, along with an SSIM transfer request (step d). The transferring mobile device 20A may optionally include $SC_B$ as part of the target device details. If the network server 32 accepts the SSIM transfer request, the network server 32 deactivates the $SSIM_A$ (step e), and sends a deactivation message to the transferring SIM unit 22A (step f). Responsive to the received deactivation message, the transferring SIM unit 22A deactivates and deletes the $SSIM_A$ and all associated data (step g), and sends a deactivation acknowledgement message to the network server 32 (step h).

Responsive to the received acknowledgement message, the network server 32 activates the $SSIM_A$ (step i), and generates a protected version of the activated $SSIM_A$. The network server 32 may protect the activated $SSIM_A$, and send the protected $SSIM_A$ to the target mobile device 20B identified by $ID_B$ (step j). For example, the network server 32 may protect the activated $SSIM_A$ using an encryption scheme and the public key provided by $SC_B$. Alternatively, the network server 32 may protect the activated $SSIM_A$ using $K_B$. The network server 32 may also or alternatively protect the activated $SSIM_A$ by sending the activated $SSIM_A$ over a secure channel established between the network server 32 and the target mobile device 20B. Upon receiving the protected $SSIM_A$, the target SIM unit 22B decrypts and installs the activated $SSIM_A$ (step k), and sends an installation acknowledgement to the network server 32 (step l). Once the activated $SSIM_A$ is installed in the target SIM unit 22B, $SSIM_A$ becomes $SSIM_B$, and the target mobile device 20B may use the activated soft SIM credentials to obtain network services.

The above describes the network assisted transfer process in terms of secure channels established between the transferring and target mobile devices 20A, 20B, and between the transferring mobile device 20A and the network server 32. However, it will be appreciated that any secure transfer means may be used. For example, the transferring mobile device 20A may encrypt the $SSIM_A$, and send the encrypted $SSIM_A$ to the network server 32 over a non-secure channel.

The network-assisted SSIM transfer process is also fairly robust. For example, if the connection at step d is broken, the network server 32 may request a retransfer of $SSIM_A$. In the mean time, the transferring mobile device 20A may still use $SSIM_A$ to access network services. Further, if the connection at step f is broken, the transferring SIM unit 22A cannot use the soft SIM credentials because $SSIM_A$ has been deactivated at the network server 32. This prevents misuse of the soft SIM credentials by the transferring mobile device 20A. To continue the transfer process, the transferring mobile device 20A, for example, may request an update on the installation process from the network server 32. In response, the network server 32 may resend the deactivate $SSIM_A$ message.

If the connection is broken at step h, $SSIM_A$ is deactivated at the transferring SIM unit 22A and at the network server 32, and therefore, cannot be used by the transferring mobile device 20A. In this case, the network server 32 may request an update on the deactivation process from the transferring SIM unit 22A. Alternatively, the transferring SIM unit 22A may send the network server 32 a request to cancel the transfer to cause the network server 32 to reactivate the $SSIM_A$ and to send a reactivation message to the transferring SIM unit 22A to enable reactivation of the $SSIM_A$ in the transferring SIM unit 22A.

If the connection is broken at step j, the target mobile device 20B will not receive the activated $SSIM_A$. In this case, the network server 32 may attempt to resend the protected $SSIM_A$ when no acknowledgement is received from the target mobile device 20B after some predetermined amount of time. If the connection is broken at step l, the network server 32 may request an update on the installation process from the target mobile device 20B.

The above provides means for the secure transfer of soft SIM credentials while simultaneously ensuring that only one mobile device has a valid and active SSIM at a time. Thus, the present invention eliminates the need for hardware-based SIM technology, such as SIM cards. This enables simple and/or low cost mobile devices to be manufactured without the costs and space constraints associated with conventional smart cards. Further, the present invention paves the way for future communication protocols that do not require hardware SIM cards.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for transferring soft Subscriber Identity Module (SIM) credentials from a first mobile device to a second mobile device, the method comprising:
   securely sending soft SIM credentials from the first mobile device to the second mobile device;
   deactivating the soft SIM credentials at the first mobile device responsive to receipt of an installation complete message from the second mobile device; and
   deleting the soft SIM credentials from the first mobile device responsive to receipt of an activation complete message from the second mobile device.

2. The method of claim 1 further comprising establishing a secure connection between the first and second mobile devices, wherein securely sending the soft SIM credentials comprises sending the soft SIM credentials over the secure connection.

3. The method of claim 1 further comprising encrypting the soft SIM credentials, wherein securely sending the soft SIM credentials comprises sending the encrypted soft SIM credentials from the first mobile device to the second mobile device.

4. The method of claim 1 further comprising deleting the soft SIM credentials if no activation complete message is received from the second mobile device after a predetermined amount of time.

5. A method for transferring soft Subscriber Identity Module (SIM) credentials from a first mobile device to a second mobile device, the method comprising:
   receiving soft SIM credentials from the first mobile device at the second mobile device;
   installing the received soft SIM credentials and sending an installation complete message responsive to completing the installation;
   receiving a deactivation complete message from the first mobile device indicating a deactivation of the soft SIM credentials at the first mobile device;
   activating the soft SIM credentials at the second mobile device responsive to the received deactivation complete message; and
   sending an activation complete message to the first mobile device to initiate removal of the soft SIM credentials from the first mobile device.

6. The method of claim 5 further comprising establishing a secure connection between the first and second mobile devices, wherein receiving the soft SIM credentials comprises receiving the soft SIM credentials over the secure connection.

7. The method of claim 5 wherein receiving the soft SIM credentials comprises receiving an encrypted version of the soft SIM credentials from the first mobile device at the second mobile device.

8. The method of claim 5 further comprising storing the received soft SIM credentials in a SIM unit of the second mobile device.

9. A method for transferring soft Subscriber Identity Module (SIM) credentials between a first mobile device and a second mobile device using a network server, the method comprising:
   receiving an identifier for the second mobile device from the first mobile device at the network server;
   receiving soft SIM credentials associated with the first mobile device from the first mobile device at the network server;
   securely sending a deactivation command to the first mobile device to initiate deactivation of the soft SIM credentials at the first mobile device;
   activating the soft SIM credentials at the network server responsive to receiving a deactivation acknowledgement from the first mobile device; and
   securely sending the activated soft SIM credentials to the second mobile device.

10. The method of claim 9 wherein receiving the identifier and the soft SIM credentials comprises receiving an encrypted version of the identifier associated with the second mobile device from the first mobile device and an encrypted version of the soft SIM credentials associated with the first mobile device at the network server.

11. The method of claim 9 wherein securely sending the activated soft SIM credentials comprises encrypting the activated soft SIM credentials associated with the first mobile device, and sending the encrypted soft SIM credentials to the second mobile device.

12. The method of claim 9 wherein securely sending the activated soft SIM credentials comprises applying a predetermined shared secret to the activated soft SIM credentials associated with the first mobile device to generate protected soft SIM credentials, and sending the protected soft SIM credentials to the second mobile device.

13. The method of claim 9 wherein securely sending the activated soft SIM credentials comprises sending the activated soft SIM credentials over a secure channel established between the network server and the second mobile device.

14. The method of claim 9 further comprising establishing a secure connection between the network device and the first mobile device, wherein receiving the soft SIM credentials comprises receiving the soft SIM credentials over the secure connection.

* * * * *